United States Patent [19]

Heard

[11] Patent Number: 4,849,484

[45] Date of Patent: Jul. 18, 1989

[54] POLYMERIC PARTICLES, THEIR MANUFACTURE AND USES

[75] Inventor: Michael B. Heard, West Yorkshire, England

[73] Assignee: Allied Colloids, Ltd., England

[21] Appl. No.: 98,271

[22] Filed: Sep. 18, 1987

[30] Foreign Application Priority Data

Sep. 22, 1986 [GB] United Kingdom .................. 8622797

[51] Int. Cl.[4] ........................ C08L 33/02; C08L 33/24
[52] U.S. Cl. .................................... 525/221; 525/218
[58] Field of Search .................. 525/221, 218; 239/34, 239/54

[56] References Cited

U.S. PATENT DOCUMENTS 4,330,450 5/1982 Lipowski et al. .................. 524/547
4,487,866 12/1984 Almond et al. ........................ 524/42

Primary Examiner—Lewis T. Jacobs
Assistant Examiner—Susan Berman
Attorney, Agent, or Firm—Ostrolenk, Faber, Gerb & Soffen

[57] ABSTRACT

A slow release composition comprises particles of a cross linked polymeric matrix in which a water soluble reagent is dispersed, and the reagent is anionic, generally being a low molecular weight anionic water soluble polymer, and the matrix is a cationic, highly cross linked, polymer formed from a water soluble monomer or monomer blend.

17 Claims, No Drawings

POLYMERIC PARTICLES, THEIR MANUFACTURE AND USES

It is known to provide particles of a polymeric matrix through which is dispersed an active reagent, so as to provide slow release of the reagent from the matrix. One way of providing such particles is by diffusing the reagent into the matrix, for instance while it is swollen by a solvent, or by polymerising polymerisable material through which the reagent is uniformly distributed. For instance in EP No. 143608 a lipophilic reagent is blended with a lipophilic monomer such as methyl methacrylate while hot and the mixture is polymerised by oil-in-water suspension polymerisation to give beads of polymethyl methacrylate through which the lipophilic reagent is uniformly distributed. The reagent can be a wax inhibitor in which event the particles can usefully be introduced downhole.

This particular technique cannot be used when the reagent is an anionic water soluble reagent, for instance because the reagent would be incompatible with the polymerisable material and would, in any event, dissolve into the aqueous phase.

If a hydrophilic polymerisable material, such as acrylamide, is used in place of the lipophilic monomer the resultant polymer will be highly swellable in water, giving very fast release of reagent, unless it is very highly cross linked. However even if the polymer is so highly cross linked that it is substantially non-swellable in water the rate of release of the water soluble anionic reagent is still unacceptably high.

A slow release composition according to the invention comprises particles of a cross linked polymeric matrix formed from a water soluble monomer or monomer blend and through which a water soluble reagent is substantially homogeneously distributed, and in this composition the reagent is anionic and the polymeric matrix is cross linked sufficient for the particles to be substantially non-swelling in water and is cationic.

Particles of cross linked polymeric material formed of water soluble monomer or monomer blend and having water soluble reagent distributed throughout for slow release may be made by gel polymerisation of an aqueous solution of the monomer or monomer blend, the cross linking agent and the reagent, and converting the resultant gel into substantially dry particles, and in the invention the reagent is anionic, the amount of cross linking is such that the dried particles are substantially non swelling in water and the monomer or monomer blend comprises cationic, ethylenically unsaturated, water soluble monomer.

The reagent and the monomer or monomer blend must each have water solubility such that it is possible to form a substantially homogeneous aqueous solution at a concentration of monomer such that a dryable gel is produced.

The reagent is preferably a water soluble polymeric material formed from water soluble, ethylenically unsaturated, acidic monomer, optionally in a water soluble blend with one or more other ethylenically unsaturated monomers. The acidic monomer may be a sulphonic acid monomer, such as allyl sulphonic acid or, preferably, 2-acrylamido-2-methyl propane sulphonic acid, but generally is a carboxylic monomer, for instance methacrylic or, preferably, acrylic acid. A blend of acid monomers, e.g., carboxylic and sulphonic monomers, may be used. A water soluble blend may be used of either or both of these with non-ionic monomer for instance acrylamide (e.g., up to 70%) or Cl-4 alkyl or hydroxyl alkyl (meth) acrylate (e.g., up to 30%). Suitable (meth) acrylates include 2-hydroxyethyl- and 2-hydroxypropyl- (meth) acrylate. Preferably however the reagent is formed only from acidic monomers.

The acidic groups may be present as alkali metal, ammonium or amine salt groups but when the acidic monomer is a carboxylic acid monomer at least 50% of the carboxylic groups, and often substantially all, the carboxylic groups are usually in free acid form. The preferred reagent is a homopolymer of acrylic acid, often as the free acid.

The reagent is preferably used as an anti-scalant and so will normally have a molecular weight below 10,000, generally below 5,000 and preferably below 2,000 and preferably above 500.

The polymer matrix can be formed solely from water soluble cationic monomer (that can be commercially impure and often contaminated with acrylamide and/or anionic groups) but is generally formed of a water soluble blend of cationic monomer and water soluble non-ionic monomer.

The cationic monomer is preferably a water soluble ethylenically unsaturated tertiary alkylamine monomer (but the monomer can be of poor solubility if it is solubilised by being in a water soluble blend with non-ionic monomer). It can be a dialkylamino alkyl (meth) acrylamide, especially where the alkyl group of the amino alkyl contains 2 to 8 carbon atoms, especially 1,3-propylene, but the preferred cationic group is dialkylamino alkyl (meth) acrylate in which the alkyl group of the amino alkyl contains 1 to 8, preferably 2, carbon atoms. The cationic group is generally present as an acid salt or, preferably, a quaternary addition salt.

Any non-ionic monomer is preferably ethylenically unsaturated monomer. This is usually (meth) acrylamide (which may be commercially impure and contaminated with a small amount of acrylic acid or other anionic monomer). Other suitable non-ionic monomers include $C_{1-4}$ alkyl- and hydroxyalkyl- (meth) acrylates such as 2-hydroxy-ethyl- or 2-hydroxy-propyl- (meth) acrylate or methyl methacrylate, alone or blended with acrylamide.

Generally the polymer is a copolymer of a water soluble blend of 20 to 99% cationic monomer and 80 to 1% acrylamide or other non-ionic monomer, percentages being by weight of monoethylenically unsaturated monomers. The amount of cationic monomer is preferably at least 30% and most preferably at least 40% by weight of the blend but generally does not need to be above 70%. The amount of non-ionic monomer is often at least 20%.

The polymer must be cross linked sufficient to render it substantially non-swelling in water and covalent or ionic cross linking agents may be used. Suitable covalent cross linking agents are polyethylenically unsaturated mononers such as methylene bis acrylamide, the di-, tri- or polyacrylates (e.g., diethylene glycol diacrylate, trimethyol propane triacrylate, and polyethylene glycol diacrylate where the polyethylene glycol typically has a molecular weight of 200, 400 or 600) and ethylene glycol diglycidyl ether, or any of the other polyethylenically unsaturated monomers conventionally used for cross linking polymers formed from ethylenically unsaturated water soluble monomers. The amount of such monomers, based on the total weight of polymer, should always be at least 5% and generally at least 10% with amounts of 12 to 25%, often 15 or 20%, being preferred. It is generally undesirable to use more than 25 or 30%.

It is sometimes preferred to conduct the polymerisation in the presence of ionic cross linking agent. This may cross link with acrylamide or anionic groups in the monomer or with anionic groups in the reagent or both. Suitable ionic cross linking agents that may be used include aluminium or zirconium salts or other tri or higher polyvalent metal ions. Suitable amounts are generally 0.1 to 10% by weight of the polymeric matrix with amounts of 0.5 to 5% generally being best. Amounts of 5 to 25% are sometimes suitable.

Optimum release properties are often obtained with a blend of methylene bis acrylamide or other polyethylenically unsaturated monomer, generally in an amount of 12 to 25%, and aluminium or zirconium or other polyvalent metal generally in an amount of 0.5 to 5%, by weight of the polymeric matrix.

However in some instances, any diffusion of cross linking agent from the matrix is undesirable, and in these circumstances it is generally preferred to use polyethylenically unsaturated cross linking agent alone, in the absence of polyvalent metal. For instance the particles may, for use, be carried downhole in a liquid containing a natural or synthetic thickener whose properties may be changed (e.g., as a result of cross linking) if polyvalent metal diffuses into the liquid.

The gel polymerisation can be conducted by reverse phase bead polymerisation, with the aqueous solution of monomer and reagent being dispersed in a non-aqueous liquid as beads and then subjected to polymerisation, in which event the gel can be converted to dried particles by azeotroping the dispersion and separating the dried particles from the non-aqueous liquid. However best results are often obtained by conducting the gel polymerisation as a bulk gel polymerisation and then drying and comminuting the gel, for instance in conventional manner.

The combined weight of reagent, cross linking agent and monomer in the polymerisation solution is generally from 30 to 50% and the concentration of monomer in the solution is generally from 15 to 30% based on the total solution or 20 to 40% based on monomer plus water. The amount of monomer must be such that the product obtained by the gel polymerisation is sufficiently rigid that it can be subjected to the subsequent processing operations, namely drying and, often, comminution.

The particles may have a dry size of at least 20 μm and often at least 100 μm. It is usually below 3 mm, often below 1mm. For downhole use as an antiscalant, the particles are generally above 200 μm but below 1 mm, preferably being within the range 400 to 900 μm. If the amount of reagent is higher than the polymeric matrix can hold for control release purposes then there will be an undesirably large surge of reagent when release initiates. For this reason the amount of reagent is generally below about 70%, preferably below about 60% and most preferably below about 50%, by weight based on the weight of the reagent and the polymeric matrix. If the amount of reagent is very low then this involves the use of large amounts of polymeric matrix but may be advantageous from the point of view of controlling release. Generally the amount of reagent is at least about 20%, and preferably at least about 30% by weight based on the weight of reagent and matrix.

If the amount of anionic groups capable of binding with the cationic groups of the cationic polymer is not more than about the stoichiometric amount then this can lead to improved control in the release of the reagent. It is therefore often preferred that the amount of reagent is such as to provide anionic groups in an amount of below about 150%, and preferably below about 100% of the cationic groups in the matrix. It can then be preferred for the amount of reagent to be below about 30%, often in the range about 10 to 25%, or even as low as about 5% or less, by weight based on the weight of reagent and matrix. In these circumstances the stoichiometric amount is preferably calculated on the basis of anionic groups in free acid form. Another way of modifying the rate of diffusion is to use a reagent in which some of the acid groups are in the form of a salt with, for instance, an alkali metal such as sodium.

The particles may be given a surface treatment after polymerisation so as to improve their properties. For instance they may be coated with a low molecular weight cationic polymer, such as diallyl dimethyl ammonium chloride either by comminuting the gel in the presence of an aqueous solution of it, as described in EP No. 182600, or by slurrying the particles in a solution of the polymer, or the particles can be given a surface cross linking, for instance in a solution of a polyvalent metal compound.

Another useful surface treatment comprises providing a coating of a material that is relatively impermeable to the reagent but which is removable in the environment in which the particles will be used. For instance if the particles will be used in an aqueous environment then the coating should gradually dissolve or be otherwise removed in that environment. Thus the coating restrains or prevents leaching of the reagent when the particles are initially introduced into the aqueous medium, but gradually dissolves in the aqueous medium so as gradually to allow release of the reagent. Suitable coating materials are natural or modified natural polymers such as cellulosic materials and synthetic polymers such as ethylene vinyl acetate polymers and polyvinyl alcohol/acetate polymers, formulated so as to have the desired permeability and solubility properties. The coating may be applied by conventional techniques, e.g., by melt or solution coating.

The following are some examples.

EXAMPLE 1

A series of gel polymerisations were conducted using a mixture of 100 grams monomer in 100 grams water, 80 grams polyacrylic acid in 120 grams water, 15 or 20 grams methylene bis acrylamide (MBA) and 0, 0.5 or 2 grams aluminium as aluminium sulphate. Polymerisation was initiated in conventional manner and the resultant gel polymer was comminuted and ground in conventional manner to a particle size in the range of about 400 to about 850 μm.

The release properties of each of the products was determined by slurrying 1g of each dried product in 100 g water for various periods and the amount of reagent extracted from the particles was determined. In general low degrees of extraction are preferred.

The monomers used were selected from acrylamide and dimethylamino ethyl acrylate quaternised with dimethyl sulphate (the cationic monomer).

The amounts of the monomers and the cross linking agents, in grams, and the percentage extraction is shown in the following table.

| Poly- | Monomer | | Cross-Linker | | % Extraction | |
|---|---|---|---|---|---|---|
| mer | % Acrylamide | % DMAEA | Al³⁺ | MBA | 60 hrs | 200 hrs |
| 1 | 38 | 62 | 2 | 15 | 57 | 62 |
| 2 | 21 | 79 | 0 | 20 | 59 | 67 |
| 3 | 100 | 0 | 2 | 15 | 60 | 73 |
| 4 | 100 | 0 | 0.5 | 15 | 60 | 77 |
| 5 | 100 | 0 | 0 | 20 | 76 | 88 |

DMAEMA = methyl chloride quaternised dimethyl amino ethyl methacrylate
MBA = methylene bis acrylamide
AL = aluminium sulphate
PAA = polyacrylic acid (except in example 9 where 37* means that the particles contain 15% polyacrylic acid as free acid and 22% polyacrylic acid as sodium salt. The results are as follows.

| Example | Monomer (parts) | | | | | | % | % Release | | |
|---|---|---|---|---|---|---|---|---|---|---|
| | ACM | HEM | DMAEA | DMAEMA | MBA | AL | PAA | 10 hrs | 200 hrs | 600 hrs |
| 4 | 100 | — | — | — | 15 | — | 41 | 100 | 100 | 100 |
| 5 | 55 | — | 36 | 4 | 15 | — | 41 | — | 67 | 85 |
| 6 | 35 | — | 54 | 6 | 15 | 22 | 37 | — | 62 | 80 |
| 7 | 18 | — | 77 | — | 15 | 16 | 31 | — | — | — |
| 8 | — | 47.5 | 47.5 | — | 17 | 20 | 33 | — | — | — |
| 9 | 35 | — | 54 | 6 | 15 | — | 37* | — | — | — |
| 10 | 35 | — | 54 | 6 | 7 | — | 16 | — | — | — |

This clearly demonstrates the advantage of using a cationic content, and of incorporating aluminium cross linking agent.

EXAMPLE 2

Polymer 1 was produced as in Example 1 except that during comminution it was slurried in a dilute aqueous solution of diallyl dimethyl ammonium chloride.

EXAMPLE 3

Polymer 1 was made by dispersing the solution of monomer, reagent and cross linker in a non-aqueous liquid as beads and then subjecting the system to reverse phase bead polymerisation. The gel particles were then dried by azeotroping the dispersion, and were filtered from the non-aqueous liquid.

EXAMPLES 4 to 10

Polyacrylic acid of molecular weight 500 to 4,000 was provided as a 40% active solution in water and was mixed with an equal amount of a 50% by weight solution of acrylamide in water. 15% (by weight acrylamide) of methylene bis acrylamide and 15% by weight water was added to the solution. The solution was purged with nitrogen and polymerisation initiated in conventional manner to produce a rigid gel. This was comminuted and dried at 60° to 80° C. in conventional manner, and the dried particles were further ground to yield particles having sizes in the range 350 to 1000 μm. The content of polyacrylic acid in the particles was 41%.

Substantially the same process, with only minor variations in the amount of water, was conducted using various monomer blends with or without aluminium sulphate, as a source of aluminium. The amount of the polyacrylic acid that had been removed from the particles after immersion in water for various periods was recorded as a percentage of the original content of polyacrylic acid. The results are shown in the following table in which:

ACM = acrylamide
HEM = 2-hydroxy ethyl metharylate
DMAEA = methyl chloride quaternised dimethyl amino ethyl acrylate The compositions of the invention may consist wholly or mainly of the described particles when initially manufactured. For use, the particles are generally blended with other components. For instance the particles may be incorporated in a thickened aqueous liquid for downhole use, e.g., as an antiscalant.

I claim:

1. A slow release composition comprising particles having a dry size of at least 100 μm of a cross linked polymerics matrix formed from a water soluble monomer or monomer blend and through which a water soluble reagent is substantially homogeneously distributed, and in which the reagent is anionic and is a water soluble polymeric material formed from water soluble ethylenically unsaturated acidic monomer optionally blended with one or more other ethylenically unsaturated monomers as a water soluble blend, and the polymeric matrix is cross linked sufficient for the particles to be substantially non-swelling in water and is cationic.

2. A composition according to claim 1 in which the reagent is a water soluble polymeric material formed from a water soluble ethylenically unsaturated monomer or monomer blend comprising acrylic acid.

3. A composition according to claim 1 in which the polymeric matrix is formed from a monomer or monomer blend comprising a dialkyl amino alkyl acrylate acid salt or quaternary addition salt.

4. A composition according to claim 1 in which the polymeric matrix is formed from a water soluble blend of ethylenically unsaturated cationic monomer and ethylenically unsaturated non-ionic monomer.

5. A composition according to claim 1 in which the polymeric matrix is formed from ethylenically unsaturated monomer and 5 to 25% polyethylenically unsaturated momomer as cross linking agent.

6. A composition according to claim 1 in which the particles have been made by gel polymerisation of an aqueous solution of the reagent, cross linking agent and a water soluble ethylenically unsaturated monomer comprising cationic monomer, and converting the resultant gel into substantially dry particles.

7. A composition according to claim 6 and made by bulk 5 gel polymerisation followed by comminution and drying.

8. A composition according to claim 7 in which the particles are substantially all above 200 μm.

9. A composition according to claim 3 in which the polymeric matrix is formed from a monomer blend comprising an ethylenically unsaturated non-ionic monomer.

10. A composition according to claim 1 in which the particles have a surface coating of low molecular weight cationic polymer, cross linking coating, or polymeric coating that is relatively impermeable to the water soluble reagent.

11. A slow release composition comprising particles having a dry size of at least 100 μm of a cross linked polymeric matrix formed from a water soluble monomer or monomer blend and through which polyacrylic acid is substantially homogeneously distributed and the polymeric matrix is cross linked sufficiently for the particles to be substantially non-swelling in water and is cationic.

12. A slow release composition comprising particles having a dry size of at least 100 μm of a cross linked polymeric matrix formed from a monomer blend comprising an ethylenically unsaturated non-ionic monomer, the polymeric matrix being cross linked sufficient for the particles to be substantially non-swelling in water and is cationic, and through which a water soluble reagent which is a water soluble polymeric material formed from a water soluble ethylenically unsaturated monomer or monomer blend comprising acrylic acid is substantially homogeneously distributed.

13. A composition according to claim 12 in which the polymeric matrix is formed from ethylenically unsaturated monomer and 5-25% polyethylenically unsaturated monomer as cross linking agent.

14. A composition according to claim 13 in which the reagent is polyacrylic acid and the ethylenically unsaturated non-ionic monomer is acrylamide.

15. A composition according to claim 12 in which the reagent is polyacrylic acid and the ethylenically unsaturated non-ionic monomer is acrylamide.

16. A composition according to claim 15 in which the particles are substantially all above 200 microns.

17. A composition according to claim 12 in which the particles are substantially all above 200 microns.

* * * * *